3,798,098
PANEL HAVING EMBOSSED PRINTING PATTERN
Yasumasa Ogawa and Seigo Nomiyama, Kitakyushu, Japan, assignors to Dantani Sangyo Kabushiki Kaisha, Kitakyushu-shi, Fukuoka-ken, Japan
Filed Apr. 6, 1972, Ser. No. 241,711
Claims priority, application Japan, May 19, 1971, 46/33,904
Int. Cl. B44f 7/00, 9/00
U.S. Cl. 156—154                                9 Claims

ABSTRACT OF THE DISCLOSURE

A process for finishing a surface of a panel to make a dressed surface having a three-dimensional pattern comprises printing a desired pattern on the surface of the panel with a printing ink containing a foaming agent which generates gases through reaction with a hardening agent in a transparent coating material subsequently applied thereon, subsequently applying a transparent coating material containing the hardening agent onto the entire printed surface to cause reaction of the hardening agent and the foaming agent thereby to foam and inflate the printed domains, and then after drying the coated layer grinding off a part of the foamed and inflated portions to form a three-dimensional concave pattern.

---

Figure 1:
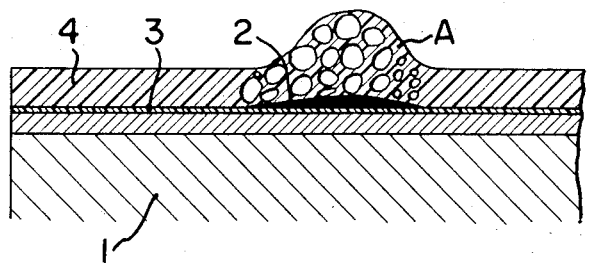

The present invention relates to a method for finishing a surface of a panel comprising a variety of organic or inorganic flat bodies such as paper, cloth, synthetic resin sheet, rubber sheet, plywood, fiber board, particle board, metal plate or foil, glass sheet, porcelain and plaster board to make a dressed surface having three-dimensional patterns. More particularly the present invention relates to a method for processing the surface of the panel to a finished surface having a three-dimensional pattern, for example, a natural grain pattern, and to the article of manufacture obtained by the method.

The most conventional means for processing plywood, plastic sheets and other panel having flat surfaces to finished surfaces of three-dimensional patterns are embossing and engraved plate printing. Both of them require an engraved plate or roll, which necessitates high expenses in manufacture. Moreover, the pattern of the finished surface obtained by such methods is unsatisfactory in that the stereographic feeling is poor and that cracks and other defects are prone to occur in the pattern. As a further means for forming a subject pattern, there is known a method referred as "imitation embossing" in which printing is conducted with plateless engraving ink, powder of a fusible resin is scattered and stuck to the painted lines while the printed ink is not yet dried sufficiently, and the adhering resin is heated and molten to make a cubic pattern. Even with the method, however, the operation is troublesome, and the finished surface obtained does not present a satisfactory stereographic impression.

An object of the present invention is to provide a novel method of processing the surface of a panel having flat surface using usual photogravure means and which may attain a finished processed surface having different lusters in concave and convex portions and exhibiting a natural three-dimensional feeling.

Another object of the present invention is to provide a method which is extremely efficient to manufacture a panel having a cubic pattern very similar to the natural grain of wood. Further objects of the present invention will be apparent from the following detailed description.

The above-mentioned objects of the present invention are accomplished by the method of the present invention wherein usual ink for photogravure printing is compounded with a foaming agent which generates gases through reaction with a hardening agent for a film forming resin contained in a transparent coating material to be applied on a printed surface, a suitable pattern is printed on the surface of a panel with the said printing ink, subsequently the transparent coating material containing the hardening agent is applied onto the entire printed surface so that the hardening agent and the foaming agent are caused to react in printed domains to generate gases thereby to form porous projections, and a part of the inflated portion is ground off to form three-dimensional concave patterns thereat.

According to the present invention, the finish coating paint and varnish to be applied on the printed surface should be transparent and have the property of being hardenable by means of the hardening agent. The hardening agent should not only act as such, but also easily react with the foaming agent in the printing ink and thereby generate the gas. From these points of view, the hardening agent consists preferably of an inorganic acid such as hydrochloric acid, sulfuric acid and phosphoric acid, or an acidic organic compound such as paranitrosulfonate or other sulfonates and butyl phosphate. Accordingly, the finish coating material is preferably a paint and varnish containing a resin of the acid-setting type as the film forming substance.

As the result of studies on various coating materials, the inventors of the present invention have found that the acid-setting type aminoalkyd resin coating materials hardenable at normal temperature such as conventionally used for the pre-finish of wood, particularly plywood, and coating materials for furnitures and others.

In this specification, the term "acid-setting type aminoalkyd resin" means the initial condensates between nitrogen compound, e.g. urea and/or melamine, and formaldehyde, or etherified amino resins etherified with such as butanol, e.g. butylated melamine resin, butylated benzoguanamine resins or butylated urea resins, or blend of resins described above compounded with other resins such as hexamethoxy methylomelamine resins and alkyd resins. Preferable alkyd resins are short oil ones compatible with amino resins, for example, an alkyd resin in which the mole ratio of glycerine: phthalic anhydride:fatty acid is about 6:6:2 and the oil length is at 31.5% or less.

The compounding proportion of the amino resin and the alkyd resin is preferably a ratio of 60 to 80 parts by weight of alkyd resin with respect to 20 to 40 parts by weight of amino resin.

The coating material is prepared by dissolving the above-mentioned amino-alkyd resin in an appropriate solvent, and adding coloring materials and deglossing agents as may be needed. The coloring material may be selected from appropriate and well-known pigments or dyes and selected depending on a desired color of the applied layer. The deglossing agent may be compounded if desired, and fine powder of silica usually employed for deglossing of coating materials is preferable. The solvent may be any of those generally used in the amino-alkyd resin coating materials, and the most representative solvents are alcohols such as ethanol and methanol, hydrocarbons such as toluene and xylene, and mixed solvents of alcohol and hydrocarbon. For example, a mixed solvent of alcohol and hydrocarbon at the ratio of 40–20 parts by volume of alcohol and 60–80 parts by volume of hydrocarbon is used most preferably.

The coating material is required to be compounded with the acid hardening agent as previously mentioned. Advantageously the hardening agent is compounded into the coating material by dissolving both the inorganic acid and the organic acid substance in a solvent of the alcohol series, e.g. ethanol, and then compounding the solution with the coating material.

By way of example, a hardening agent of the following composition may be used:

|  | Parts by volume |
|---|---|
| Inorganic acid | 10 to 20 |
| Organic acid substance | 10 to 20 |
| Alcohol | 70 |

A preferable composition of the coating material used in the present invention is as follows:

|  | Parts by weight |
|---|---|
| Amino-alkyd resin | 50 to 60 |
| Solvent | 34 to 80 |
| Pigment | Any suitable amount |
| Deglossing agent | 0 to 60 |

The resinous solution of the above composition and the foregoing hardening agent solution are compounded thereinto at the following proportion:

|  | Parts by weight |
|---|---|
| Resinous solution | 100 |
| Hardening agent solution | 10 to 40 |

The compounded coating material is diluted with an optional diluent, and then used. The diluent may be the same as the solvent, or any conventional non-solvent. The coating material thus prepared may be used not only as that for forming the three-dimensional pattern of the present invention, but also as final finish coating material which is, if necessary, further coated thereon. In case of using it as the final finish coating material, the following composition is preferable:

|  | Parts by weight |
|---|---|
| Alkyd-amino resin solution | 100 |
| Hardener solution | 10 |
| Solvent or diluent | 5 to 10 |

According to the method of the present invention, a suitable pattern is printed on a base material at the first step. The printing ink used therefor may be appropriately selected from well-known printing ink in dependence upon the kind of the base material to be processed. The sorts of usable printing ink are broadly classified into printing ink for paper, direct printing ink and printing ink for metal. The printing ink for paper contains a solution of cellulose esters such as cellulose acetate and nitro-cellulose as a vehicle, the ink for direct printing contains an alkyd resin solution as the same, and the printing ink for metal contains mainly a vinyl series resin solution as the same. The vehicles are prepared by dissolving the above tackifiers, i.e. resin constituents, in suitable solvents.

Well-known solvents may be used as the solvent for ink, and by way of example, the following composition is preferably employed:

|  | Parts by volume |
|---|---|
| Methylethyl ketone | 60 |
| Methylisobutyl ketone | 30 |
| Acetone | 10 |

According to the present invention, a foaming agent is compounded into the printing ink as mentioned above. As has already been stated, the foaming agent is selected from among chemical compounds which may be decomposed through reaction with the acidic hardening agent contained in the coating material and thereby generate gases. The examples of the foaming agent are inorganic compounds such as calcium sulfide, iron sulfide, barium carbonate, alkali bicarbonate and organic bases such as dinitro-pentamethylene-tetramine (DPT).

The composition of the printing ink may be changed depending on the kind of the binding agent and that of hardening agents employed. The typical compositions are as follows:

| Formula Number | 1 | 2 | 3 | 4 | 5 | 6 | 7 |
|---|---|---|---|---|---|---|---|
| Resin: | | | | | | | |
|   Cellulose ester | | | | | 50 | | |
|   Alkyd resin | 50 | 50 | 50 | 50 | | 10 | |
|   Vinyl series resin | | | | | | | 10 |
| Pigment | 30 | 30 | 35 | 30 | 30 | 30 | 30 |
| Solvent | 50 | 50 | 50 | 45 | 50 | 50 | 40 |
| Foaming agent: | | | | | | | |
|   Calcium sulfide | 40 | | | | | | |
|   Iron sulfide | | 35 | | | | | |
|   Barium carbonate | | | 40 | | | | |
|   Sodium bicarbonate | | | | 40 | | | |
|   DPT | | | | | 35 | 40 | 40 |

The present invention will be carried out as follows:

Using the ink described above, a desired pattern such as a grain pattern is printed on the surface of a suitable base material. The printing may be carried out by means of, for example, photogravure printing, and it is preferable. Both one-color printing and multicolor printing may be employed for the printing.

When the printed pattern is dried, the aforesaid coating material is applied on the entire printed surface. The application of the coating material may be carried out by spraying, roll coating or any other painting means.

When the coating layer is applied on the printed surface, the hardening agent contained in the coating material reacts with the foaming agent contained in the ink already adhered to the surface of the base material. The coating material layer on the printed lines is foamed. Accordingly, it becomes porous and embossed. The coated product is carried into a drier, and the coated layer is dried and hardened.

After the coated layer has been dried, its surface is ground by a buffing roll sander, paper sander, brush roll or the like. Thus the porous embossed portions on the lines of the print are removed by the grinding. Then, a concave pattern having a rough bottom is formed.

While, in this case, the thickness of the coated layer may be changed in dependence upon the desired pattern, a thickness of 30 to 60 g./m.$^2$ is generally preferred.

In accordance with the above method, as every parts of the printed pattern on the base material have different amount of the ink, every parts of the coated layer on the printed ink give different porosities depending on the amount of ink located thereunder. As a result, the breaking strength of the projecting portions differs at the various parts. The projecting portions are accordingly different in the amount of the coated layer as removed by the sander or brush. The concave portions of the lines thus formed differ in depth and accordingly in shade and luster at the various parts. In this way, a dressed surface exhibiting a three-dimensional impression very close to a natural grain pattern is formed in accordance with the present invention.

The dressed surface formed as described above may be utilized as it is. In many cases, however, it is desirable to further apply a transparent final finish coating material thereon. For the final finish painting, the amino-alkyd resin coating materials may be used as has been previously stated. In addition, any coating materials generally employed as the finish coating materials, e.g. a polyester resin coating material, may be used.

In the performance of the above method, the printing may be directly applied on the base plate of plywood or any other rigid body to make decorated panels. However, it is also possible that a pattern is printed on paper at the first step, the printed paper is adhered to the base plate of plywood etc., with an adhesive and the surface is processed to a cubic pattern as in the foregoing manner.

The present invention will be better understood by way of the following embodiments described with reference to the accompanying drawings.

Figure 2:
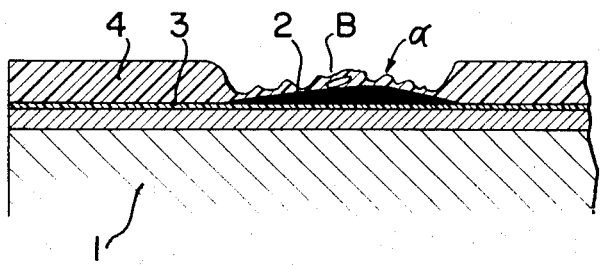
Figure 3:
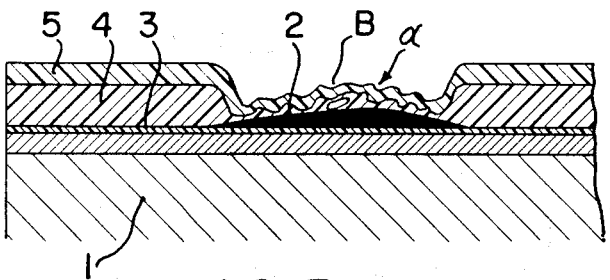
Figure 4:
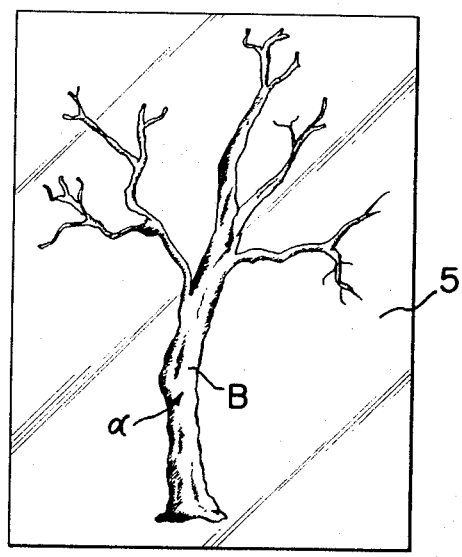

FIGS. 1 through 3 illustrate in the order of the steps of manufacture, wherein a piece of printed paper is bounded to a surface of a plywood, the surface is finished to a three-dimensional dressed surface. FIG. 1 is a sectional view showing state in which a finish coating material is applied to cause drawn line parts to protrude in porous condition, FIG. 2 is a sectional view showing a state in which the porous protrusions are removed by a sander, and FIG. 3 is a sectional view showing a state in which a final finish coating material is further applied thereon. FIG. 4 is a plan view showing an example of a panel manufactured by the method of the present invention.

In the figures, numeral 1 designates a plywood base plate.

On the base plate, a piece of paper 3 having a printing 2 is adhered and on the printed surface a transparent layer 4 is applied. Because the printing ink contains a foaming agent and the coated layer 4 applied on the printing 2 contains a hardening agent which is able to react with the foaming agent to generate gases, a portion of the coated layer which is situated on the lines of the printed pattern, protrudes or inflates giving a porous form as shown as A in FIG. 1.

The porous protrusions A are removed by grinding to leave concave portions B as shown in FIG. 2. The bottoms of the concave portions are composed of a number of convex parts α and concave parts β, which are respectively different in luster and concentration of color. The surface having concave pattern can be covered with a finish transparent coating layer 5 as shown in FIG. 3.

EXAMPLE 1

| | Parts by weight |
|---|---|
| Cellulose acetate | 50 |
| Solvent | 50 |
| Pigment | 30 |
| DPT | 30 |

Herein, the solvent was a mixed one consisting of:

| | Parts by weight |
|---|---|
| Methylethyl ketone | 60 |
| Methylisobutyl ketone | 30 |
| Acetone | 10 |

Printing ink of the above composition was prepared, and a suitable pattern was printed on a piece of paper with the ink.

The printed paper was joined onto a plywood base plate with an adhesive consisting of an emulsion of vinyl acetate series resin, and by means of a hot press or a laminating machine.

A transparent amino-alkyd resin coating material of a composition below mentioned, was applied on the printed paper on the plywood to a thickness of 6–8 g./900 cm.³ using a roll coater. With a drier circulating hot air at 10 to 120° C., the coated layer was dried for ten minutes, and the coated film was hardened. Subsequently, the coated surface was ground by the use of buffing rolls of #240, #320 and #400, to remove foamed projections. Then, the processed surface was again applied thereon with a final finish coating material of a composition stated below. It was dried by the hot air circulating drier.

In this example, the following coating materials of the same series were used for both the primary coating and the final finish coating.

| | Parts by weight | |
|---|---|---|
| | Primary | Final finish |
| Amino-alkyd resin solution (solid content 60%) | 100 | 100 |
| Hardening agent solution | 40 | 1 |
| Hydrochloric acid | 20 | |
| Butyl phosphate | 15 | |
| Ethanol | 65 | |
| Diluent (ethanol, 30 parts; toluol, 70 parts) | | 10 |
| Example 2: | | |
| Alkyd resin | 10 | |
| Pigment | 30 | |
| Solvent | 50 | |
| Toluol, 40 parts | | |
| Xylol, 60 parts | | |
| DPT | 40 | |

Printing ink of the above composition was prepared. With the ink and by the photogravure offset printing process, printing was carried out on a plywood surface which has been filled and colored with foundation color.

Subsequently, a coating material of a composition below mentioned was applied to a thickness of 6 g./900 cm.² by means of a roll coater. With a hot air circulating drier machine, it was dried at 100 to 120° C. for about 10 minutes and thereby hardened. A product thus obtained was ground by means of buffing rolls of #240, #320 and #400, and porous projections were removed. At the last step, a final finish coating material of a composition below mentioned was coated, and was similarly dried at 100 to 120° C. using the drier.

Compositions of the coating materials:

| | Parts by weight | |
|---|---|---|
| | Primary | Final finish |
| Amino-alkyd resin solution (solid content 60%) | 100 | 100 |
| Hardening agent solution¹ | 40 | 10 |
| Diluent¹ (ethanol, 30 parts; toluol, 70 parts) | | 10 |

¹ Same as in Example 1.

EXAMPLE 3

| | Parts by weight |
|---|---|
| Vinyl series resin | 10 |
| Pigment | 30 |
| Solvent | 40 |
| Methylethyl ketone | 70 |
| Acetone | 30 |
| DPT | 40 |

With the above ink, a suitable pattern was printed on an aluminum foil. The printed aluminum foil was superposed on a plywood base plate, and was jointed thereto using a binder consisting of an emulsion of modified vinyl acetate series resin.

A transparent coating material of amino-alkyd resin as mentioned below was coated on the aluminum foil surface of the lamination by means of a sprayer. Thus, a coated layer of a thickness of 6 g./900 cm.³ was formed.

With a hot air circulating drier, the coated layer was subsequently dried at 100 to 120° C. for about ten minutes, to be hardened.

Next the hardened surface was ground by means of buffing rolls #240, #320 and #400, to remove porous projections. Then, a final finished coating material was again applied, and was dried by a similar drier.

The compositions of the coating materials were as follows:

| | Parts by weight | |
|---|---|---|
| | Primary | Final finish |
| Amino-alkyd resin solution (solid content 60%) | 100 | 100 |
| Hardening agent solution | 40 | 10 |
| Diluent | | 1 |

EXAMPLE 4

Using the ink of the previously-mentioned Formula 1 and coating materials of the following formulae, the method of Example 1 was repeated.

The compositions of the coating materials were as follows:

| | Parts by weight | |
|---|---|---|
| | Primary | Final finish |
| Melamine resin solution (solid content 57%) | 100 | 100 |
| Hardening agent solution | 30 | 10 |
| Hydrochloric acid | 20 | |
| Ethanol | 10 | |
| Sulfonic acid | 70 | |
| Diluent (ethanol, 30 parts by weight; toluol, 70 parts by weight) | | 10 |

We claim:

1. A process for finishing a surface of a panel to make a dressed surface having a three-dimensional pattern which comprises printing a desired pattern on the surface of the panel with a printing ink containing a foaming agent which generates gases through reaction with a hardening agent, the latter being included in a transparent coating material subsequently applied thereon, said foaming agent being selected from the group consisting of calcium sulfide, iron sulfide, barium carbonate, alkali bicarbonate and dinitro-pentamethylenetetramine, subsequently applying said transparent coating material containing the hardening agent onto the entire printed surface to cause reaction of the hardening agent and the foaming agent thereby to foam and inflate portions of the coated layer along lines of the printed pattern, said transparent coating material comprising an aminoalkyd resin of the acid-setting type, said hardening agent being a member selected from the group consisting of hydrochloric acid, sulfuric acid, phosphoric acid, sulfonates, butyl phosphate and mixtures thereof, and then after drying the coated layer grinding off a part of the foamed and inflated portions to form a three-dimensional concave pattern.

2. A process according to claim 1 in which the panel is a member selected from the group consisting of plywood, fiber board, particle board, synthetic resin sheet, rubber sheet, metal sheet or foil, glass sheet, porcelain board, plaster board, cloth and paper sheet.

3. A process according to claim 1 in which a piece of paper is printed with the ink, the resulted printed paper is adhered on the surface of a panel and then the coating material is applied on the printed surface and after drying the coated layer the surface is treated with grinding means.

4. A process according to claim 1, in which the surface having three-dimensional pattern is further coated with a transparent finish coating material.

5. The process according to claim 1 wherein said aminoalkyd resin of the acid setting type is a member selected from the group consisting of condensation products of formaldehyde and urea, condensation products of formaldehyde and melamine, condensation products of formaldehyde with urea and melamine, etherified melamine resins, etherified benzoguanamine resins, etherified urea resins and mixtures thereof.

6. The process according to claim 5 wherein said aminoalkyd resin is dissolved in a solvent, which is an alcohol, a hydrocarbon and mixtures thereof.

7. The process according to claim 1 wherein said printing is one color or multicolor.

8. The process according to claim 1 wherein said coated layer has a thickness of 30–60 g./m.$^2$.

9. A panel having a surface with a three-dimensional pattern prepared by the process of claim 1.

References Cited
UNITED STATES PATENTS

| | | | |
|---|---|---|---|
| 3,432,328 | 3/1969 | Vaurio | 106—20 |
| 3,719,549 | 3/1973 | Mittman | 156—153 |
| 3,654,044 | 4/1972 | Hirota | 156—277 |
| 3,479,197 | 11/1969 | Mork | 117—12 |

ALFRED L. LEAVITT, Primary Examiner

F. FRISENDA, Jr., Assistant Examiner

U.S. Cl. X.R.

106—23, 32; 117—8, 12, 15, 38, 62.1; 156—59, 78, 277